United States Patent
Zhu et al.

(10) Patent No.: US 12,200,609 B2
(45) Date of Patent: *Jan. 14, 2025

(54) SEARCH SCHEDULING FOR WIRELESS COMMUNICATIONS

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

This patent is subject to a terminal disclaimer.

(21) Appl. No.: 17/439,366

(22) PCT Filed: Nov. 22, 2019

(86) PCT No.: PCT/US2019/062875
§ 371 (c)(1),
(2) Date: Sep. 14, 2021

(87) PCT Pub. No.: WO2020/190342
PCT Pub. Date: Sep. 24, 2020

(65) Prior Publication Data
US 2022/0159557 A1 May 19, 2022

Related U.S. Application Data

(63) Continuation of application No. 16/359,781, filed on Mar. 20, 2019, now Pat. No. 10,492,130.

(51) Int. Cl.
*H04W 48/16* (2009.01)
*H04W 24/10* (2009.01)
(Continued)

(52) U.S. Cl.
CPC ........... *H04W 48/16* (2013.01); *H04W 24/10* (2013.01); *H04W 56/001* (2013.01); *H04W 72/046* (2013.01); *H04W 36/302* (2023.05)

(58) Field of Classification Search
CPC ..... H04W 48/16; H04W 24/10; H04W 36/30; H04W 56/001; H04W 72/046; H04W 72/0406
See application file for complete search history.

(56) References Cited

U.S. PATENT DOCUMENTS 10,492,130 B1 11/2019 Zhu et al.
11,115,984 B2 * 9/2021 Grant .................. H04B 7/0617
(Continued)

FOREIGN PATENT DOCUMENTS

CN 102164374 A 8/2011
CN 108476188 A 8/2018
(Continued)

OTHER PUBLICATIONS

Giordani M., et al., "A Tutorial on Beam Management for 3GPP NR at mmWave Frequencies", IEEE Communications Surveys & Tutorials, vol. 21, No. 1, First Quarter 2019, pp. 173-196.
(Continued)

*Primary Examiner* — Khawar Iqbal
(74) *Attorney, Agent, or Firm* — QUALCOMM Incorporated

(57) ABSTRACT

Aspects of the present disclosure provide a method for wireless communication at a user equipment (UE). The method includes selecting, for each of a plurality of periodic search opportunities, one receive beam of a plurality of receive beams for receiving at least one synchronization signal. The plurality of periodic search opportunities includes a plurality of regular search opportunities and a plurality of prioritized search opportunities. The plurality of
(Continued)

receive beams includes at least one prioritized receive beam and at least one additional receive beam. The selecting includes selecting from the at least one prioritized receive beam for each of the plurality of prioritized search opportunities; and selecting from the plurality of receive beams for each of the plurality of regular search opportunities. The method further includes receiving, at each of the plurality of periodic search opportunities, the corresponding at least one synchronization signal using the corresponding selected receive beam.

28 Claims, 11 Drawing Sheets

(51) Int. Cl.
*H04W 56/00* (2009.01)
*H04W 72/04* (2023.01)
*H04W 72/044* (2023.01)
*H04W 36/30* (2009.01)

(56) References Cited

U.S. PATENT DOCUMENTS

| | | | | |
|---|---|---|---|---|
| 11,546,030 | B2* | 1/2023 | Lee | H04B 7/0617 |
| 11,723,049 | B2* | 8/2023 | Xi | H04L 5/0094 |
| | | | | 370/329 |
| 11,729,839 | B2* | 8/2023 | Kim | H04W 56/001 |
| | | | | 370/329 |
| 11,751,183 | B2* | 9/2023 | Hakola | H04B 7/0695 |
| | | | | 370/329 |
| 11,770,839 | B2* | 9/2023 | Kim | H04W 48/14 |
| | | | | 370/329 |
| 2017/0339662 | A1* | 11/2017 | Lin | H04W 36/00698 |
| 2018/0084593 | A1 | 3/2018 | Chen et al. | |
| 2018/0192384 | A1 | 7/2018 | Chou et al. | |
| 2018/0234156 | A1 | 8/2018 | Tsai et al. | |
| 2018/0368189 | A1 | 12/2018 | Narasimha et al. | |
| 2019/0007123 | A1 | 1/2019 | Rune et al. | |
| 2019/0014570 | A1 | 1/2019 | Nam et al. | |
| 2019/0044677 | A1 | 2/2019 | Ly | |
| 2019/0059129 | A1 | 2/2019 | Luo et al. | |
| 2019/0159152 | A1 | 5/2019 | Liu et al. | |
| 2019/0191397 | A1 | 6/2019 | Pan et al. | |
| 2019/0289640 | A1* | 9/2019 | Kim | H04W 72/046 |
| 2020/0052803 | A1* | 2/2020 | Deenoo | H04W 48/12 |
| 2021/0336688 | A1* | 10/2021 | Lee | H04W 4/40 |
| 2022/0240193 | A1* | 7/2022 | Xu | H04W 52/146 |
| 2022/0322480 | A1* | 10/2022 | Deenoo | H04W 72/23 |
| 2023/0051047 | A1* | 2/2023 | Xu | H04W 24/04 |

FOREIGN PATENT DOCUMENTS

| | | |
|---|---|---|
| WO | 2018064271 A1 | 4/2018 |
| WO | 2018129319 A1 | 7/2018 |
| WO | 2019034996 A1 | 2/2019 |

OTHER PUBLICATIONS

Huawei, et al., "Beam Management Enhancements for Latency and Overhead Reduction", 3GPP Draft, 3GPP TSG RAN WG1 Meeting #94bis, R1-1810105, 3rd Generation Partnership Project (3GPP), Mobile Competence Centre, 650, Route Des Lucioles, F-96921 Sophia-Antipolis Cedex, France, vol. RAN WG1, No. Chengdu, China, Oct. 8, 2018-Oct. 12, 2018, Sep. 29, 2018 (Sep. 29, 2018), XP051517520, 5 Pages, Retrieved from the Internet: URL: http://www.3gpp.org/ftp/tsg%5Fran/WG1%5FRL1/TSGR1%5F94b/Docs/R1%2D1810105%2Ezip.

Huawei, et al., "UL/DL BM for Latency/Overhead Reduction", 3GPP Draft, 3GPP TSG RAN WG1 Meeting #96, R1-1903090, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600786, 7 Pages, Retrieved from the Internet: URL: http://www.3gpp.org/ftp/tsg%5Fran/WG1%5FRL1/TSGR1%5F96/Docs/R1%2D1903090%2Ezip [retrieved on Feb. 16, 2019], the whole document.

International Search Report and Written Opinion—PCT/US2019/062875—ISA/EPO—Mar. 16, 2020.

Liu J., et al., "Initial Access, Mobility, and User-Centric Multi-Beam Operation in 5G New Radio", IEEE Communications Magazine, vol. 56, No. 3, Mar. 1, 2018 (Mar. 1, 2018), pp. 35-41, XP055480195, US, ISSN: 0163-6804, DOI: 10.1109/MCOM.2018.1700827, p. 35, p. 37-p. 40.

Mazin A., et al., "Accelerating Beam Sweeping in mmWave Standalone 5G New Radios using Recurrent Neural Networks", 2018 IEEE Vehicular Technology Conference (VTC—Fall), 2018, 4 Pages.

Taiwan Search Report—TW108143092—TIPO—Feb. 8, 2023.

* cited by examiner

SEARCH SCHEDULING FOR WIRELESS COMMUNICATIONS

CLAIM OF PRIORITY

The present Application for Patent claims priority to and is a Continuation of U.S. Non-Provisional application Ser. No. 16/359,781, entitled "SEARCH SCHEDULING FOR WIRELESS COMMUNICATIONS" filed on Mar. 20, 2019, assigned to the assignee hereof and hereby expressly incorporated by reference herein.

INTRODUCTION

Aspects of the present disclosure relate to wireless communications, and more particularly, to search scheduling for wireless communications.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication at a user equipment (UE). The method includes selecting, for each of a plurality of periodic search opportunities, one receive beam of a plurality of receive beams for receiving at least one synchronization signal. The plurality of periodic search opportunities includes a plurality of regular search opportunities and a plurality of prioritized search opportunities. The plurality of receive beams includes at least one prioritized receive beam and at least one additional receive beam. The selecting includes selecting from the at least one prioritized receive beam for each of the plurality of prioritized search opportunities; and selecting from the plurality of receive beams for each of the plurality of regular search opportunities. The method further includes receiving, at each of the plurality of periodic search opportunities, the corresponding synchronization signal using the corresponding selected receive beam.

Certain aspects of the present disclosure provide a UE. The UE includes a memory and a processor coupled to the memory. The memory and processor are configured to select, for each of a plurality of periodic search opportunities, one receive beam of a plurality of receive beams for receiving at least one synchronization signal. The plurality of periodic search opportunities includes a plurality of regular search opportunities and a plurality of prioritized search opportunities. The plurality of receive beams includes at least one prioritized receive beam and at least one additional receive beam. To select includes to select from the at least one prioritized receive beam for each of the plurality of prioritized search opportunities; and to select from the plurality of receive beams for each of the plurality of regular search opportunities. The memory and processor are further configured to receive, at each of the plurality of periodic search opportunities, the corresponding synchronization signal using the corresponding selected receive beam.

Certain aspects of the present disclosure provide a UE. The UE includes means for selecting, for each of a plurality of periodic search opportunities, one receive beam of a plurality of receive beams for receiving at least one synchronization signal. The plurality of periodic search opportunities includes a plurality of regular search opportunities and a plurality of prioritized search opportunities. The plurality of receive beams includes at least one prioritized receive beam and at least one additional receive beam. The means for selecting is configured to select from the at least one prioritized receive beam for each of the plurality of prioritized search opportunities; and select from the plurality of receive beams for each of the plurality of regular search opportunities. The UE further includes means for receiving, at each of the plurality of periodic search opportunities, the corresponding synchronization signal using the corresponding selected receive beam.

Certain aspects of the present disclosure provide a non-transitory computer readable storage medium that stores instructions that when executed by a user equipment (UE) cause the UE to perform a method for wireless communication. The method includes selecting, for each of a plurality of periodic search opportunities, one receive beam of a plurality of receive beams for receiving at least one synchronization signal. The plurality of periodic search opportunities includes a plurality of regular search opportunities and a plurality of prioritized search opportunities. The plurality of receive beams includes at least one prioritized receive beam and at least one additional receive beam. The selecting includes selecting from the at least one prioritized receive beam for each of the plurality of prioritized search opportunities; and selecting from the plurality of receive beams for each of the plurality of regular search opportunities. The method further includes receiving, at each of the plurality of periodic search opportunities, the corresponding synchronization signal using the corresponding selected receive beam.

Certain aspects of the present disclosure provide a method for wireless communication at a user equipment (UE). The method includes selecting, for a plurality of search opportunities, receive beams of a plurality of receive beams for receiving synchronization signals, the plurality of receive beams comprising at least one receive beam and at least one additional receive beam. The selecting includes selecting from the at least one receive beam for a first search opportunity of the plurality of search opportunities; and selecting from at least the at least one additional receive beam for a second search opportunity of the plurality of search opportunities. The method further includes receiving, at the plurality of search opportunities, the corresponding synchronization signals using the corresponding selected receive beams.

Certain aspects of the present disclosure provide a UE. The UE includes a memory and a processor coupled to the memory. The memory and processor are configured to select, for a plurality of search opportunities, receive beams of a plurality of receive beams for receiving synchronization signals, the plurality of receive beams comprising at least one receive beam and at least one additional receive beam. To select includes to select from the at least one receive beam for a first search opportunity of the plurality of search opportunities; and to select from at least the at least one additional receive beam for a second search opportunity of the plurality of search opportunities. The memory and processor are further configured to receive, at the plurality of search opportunities, the corresponding synchronization signals using the corresponding selected receive beams.

Certain aspects of the present disclosure provide a UE. The UE includes means for selecting, for a plurality of search opportunities, receive beams of a plurality of receive beams for receiving synchronization signals, the plurality of receive beams comprising at least one receive beam and at least one additional receive beam. The means for selecting is configured to select from the at least one receive beam for a first search opportunity of the plurality of search opportunities; and select from at least the at least one additional receive beam for a second search opportunity of the plurality of search opportunities. The UE further includes means for receiving, at the plurality of search opportunities, the corresponding synchronization signals using the corresponding selected receive beams.

Certain aspects of the present disclosure provide a non-transitory computer readable storage medium that stores instructions that when executed by a user equipment (UE) cause the UE to perform a method for wireless communication. The method includes selecting, for a plurality of search opportunities, receive beams of a plurality of receive beams for receiving synchronization signals, the plurality of receive beams comprising at least one receive beam and at least one additional receive beam. The selecting includes selecting from the at least one receive beam for a first search opportunity of the plurality of search opportunities; and selecting from at least the at least one additional receive beam for a second search opportunity of the plurality of search opportunities. The method further includes receiving, at the plurality of search opportunities, the corresponding synchronization signals using the corresponding selected receive beams.

In certain aspects, the plurality of search opportunities include a plurality of regular search opportunities and a plurality of prioritized search opportunities, the first search opportunity is one of the plurality of prioritized search opportunities, and the second search opportunity is one of the plurality of regular search opportunities.

In certain aspects, the at least one receive beam is at least one prioritized receive beam, and the selecting for the plurality of search opportunities includes: selecting from the at least one prioritized receive beam for the plurality of prioritized search opportunities; and selecting from the at least the at least one additional receive beam for the plurality of regular search opportunities.

In certain aspects, selecting from at least the at least one additional receive beam comprises selecting from the plurality of receive beams.

In certain aspects, selecting from the at least the at least one additional receive beam for the plurality of regular search opportunities includes selecting from the at least the at least one additional receive beam such that once a given receive beam of the at least the at least one additional receive beam is selected it is not selected again until all other receive beams of the at least the at least one additional receive beam are selected.

In certain aspects, the selecting from the at least the at least one additional receive beam for the plurality of regular search opportunities includes selecting from the at least the at least one additional receive beam for the plurality of regular search opportunities in a round robin fashion.

In certain aspects, selecting from the at least one prioritized receive beam for the plurality of prioritized search opportunities includes selecting from the at least one prioritized receive beam such that once a given receive beam of the at least one prioritized receive beam is selected it is not selected again until all other receive beams of the at least one prioritized receive beam are selected.

In certain aspects, the selecting from the at least one prioritized receive beam for the plurality of prioritized search opportunities includes selecting from the at least one prioritized receive beam in a round robin fashion.

In certain aspects, the plurality of search opportunities are a plurality of periodic search opportunities.

In certain aspects, the at least one receive beam is statically defined.

Certain aspects further include dynamically determining the at least one receive beam based on measured signal quality of the corresponding synchronization signals as received using the plurality of receive beams.

In certain aspects, the at least one receive beam is dynamically determined based on each of the at least one receive beam having been selected at least a threshold number of times.

In certain aspects, the at least one receive beam is dynamically determined once every time period.

In certain aspects, the at least one receive beam is dynamically determined as at least one of the plurality of receive beams with a measured signal quality above a threshold.

In certain aspects, different receive beams are selected for adjacent search opportunities.

In certain aspects, the plurality of search opportunities includes a number of periods, each period including a regular search opportunity followed by multiple prioritized search opportunities.

In certain aspects, the plurality of receive beams comprise a plurality of psuedo-omni receive beams.

In certain aspects, the synchronization signals correspond to at least one transmit beam of at least one base station.

Certain aspects further include performing one of a beam switch or a handover procedure based on the receiving.

In certain aspects, the plurality of search opportunities include a plurality of time resources assigned to synchronization signal burst sets.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
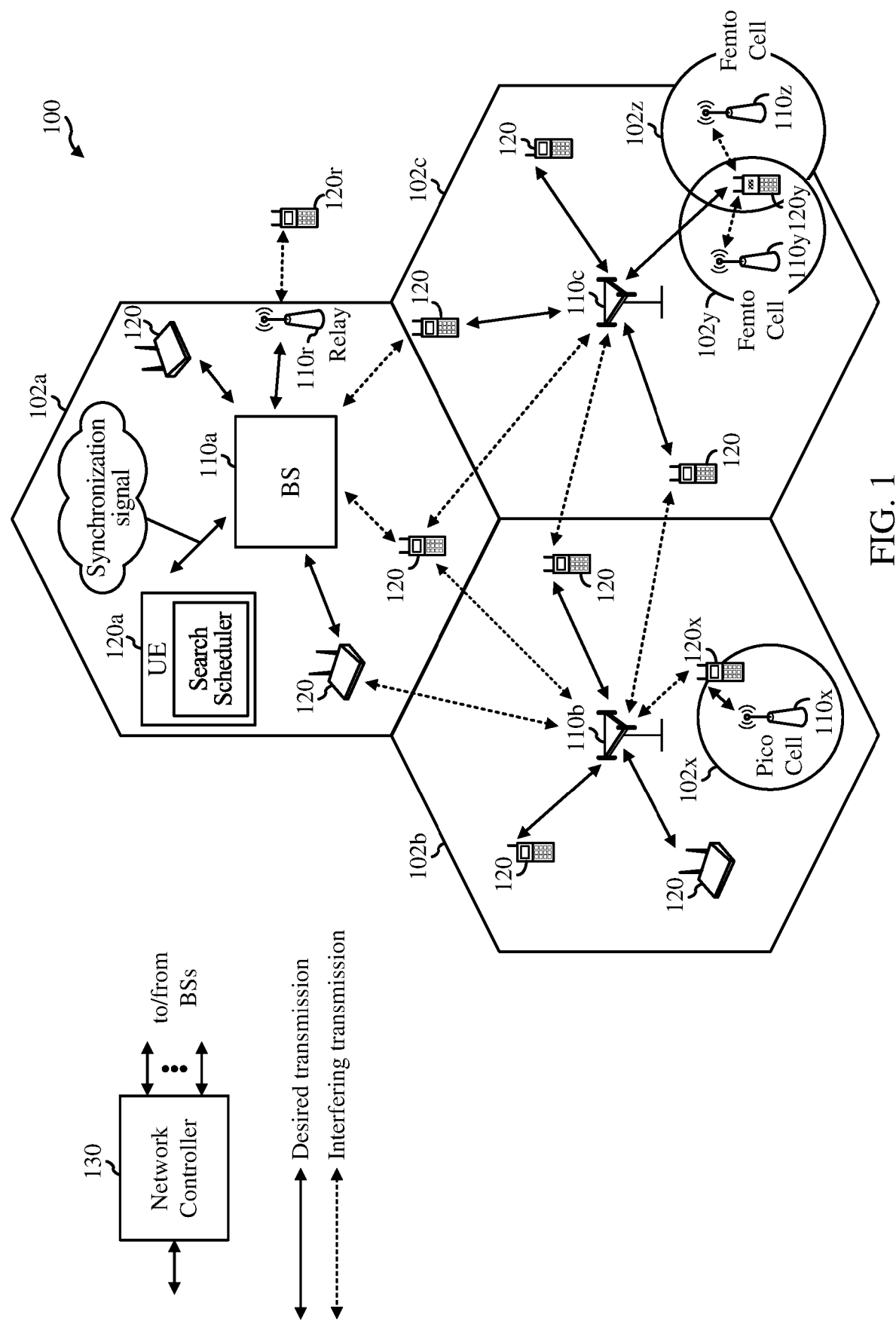
FIG. 1 is a block diagram conceptually illustrating an example telecommunications system, in accordance with certain aspects of the present disclosure.

Aspects of the present disclosure provide apparatus, methods, processing systems, and computer readable mediums for search scheduling for wireless communications. For example, certain aspects provide techniques for determining at a UE which receive beam of a plurality of receive beams to use for receiving (e.g., attempting to receive) one or more synchronization signals as part of a cell/transmit beam search procedure. The UE may have a number of search opportunities scheduled in which it can receive the one or more synchronization signals, and certain aspects provide for determining which receive beam to use for each given search opportunity. In particular, the UE prioritizes reception using certain receive beams over other receive beams, such as to improve latency/delay in determining a suitable receive beam, transmit beam, and cell to use for communication in a wireless communication network.

In wireless communication networks, such as 5G NR networks that use millimeter wave (mmW) communication, a UE may need to efficiently search and detect the best transmit (Tx)-receive (Rx) beam pair to use for communication with a BS. For example, one or more BSs, each serving one or more cells, may each transmit synchronization signals using one or more transmit beams in the one or more cells that are spatially diverse. The synchronization signals are transmitted during scheduled time periods, which the UE can utilize as search opportunities. The UE may use each of the scheduled time periods during which the BS(s) transmit synchronization signals as a search opportunity, or less than all of the scheduled time periods.

In particular, the UE may use one of its receive beams during a given search opportunity to receive synchronization signals. During a search opportunity, the UE may accordingly receive any synchronization signals from any BS in any cell over any transmit beam that overlaps with the receive beam spatially and is transmitted within the search opportunity. For that receive beam, the UE can then determine one or more metrics of measured signal quality about each of the received synchronization signals, such as signal strength, received power, signal to noise ratio (SNR), channel state information (CSI), reference signal received quality (RSRQ), reference signal received power (RSRP), reference signal strength indicator (RSSI), etc. The UE may further determine the one or more metrics for any synchronization signals received using other receive beams during other search opportunities.

Based on the one or more metrics of the synchronization signals received over the plurality of receive beams, the UE may determine a particular synchronization signal has one or more metrics that meet certain criteria (e.g., highest received power among the received synchronization signals (e.g., over a time period), satisfies a threshold, etc.). Accordingly, the UE may determine to communicate with the BS that transmitted the determined synchronization signal in the cell in which the synchronization signal was transmitted using the Tx-Rx beam pair over which the synchronization signal was transmitted by the BS and received by the UE. For example, if the UE is already communicating with that BS in that cell, but on a different Tx-Rx beam pair, the UE may send an indication to the BS to switch the beam it uses for transmission. If the UE is not communicating with that BS in that cell, the UE may initiate a cell handover procedure to begin communicating with the BS in the cell using the determined Tx-Rx beam pair.

The UE may be configured with a large number of Rx beams. Accordingly, if the UE were to use each of the Rx beams equally (e.g., in a round robin fashion) for receiving synchronization signals over the number of search opportunities, it may take a long period of time to find an appropriate Tx-Rx beam pair and cell to use for communication as the best suited Rx beam may not be used for a long period of time. Accordingly, certain aspects herein provide techniques for prioritizing reception of synchronization signals using certain Rx beams over other Rx beams, such as to improve latency/delay in determining a suitable Tx-Rx beam pair and cell to use for communication in a wireless communication network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown in FIG. 1, a user equipment (UE), such as the UE 120a in the wireless communication network 100 communicates with a serving base station (BS), such as the BS 110a in a cell 102a in the wireless communication network 100. The UE 120a includes a search scheduler configured to schedule reception of synchronization signals transmitted by BSs, such as BS 110a, on receive beams of a plurality of receive beams of the UE 120a as part of a prioritized cell/transmit beam search procedure, according to aspects disclosed herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
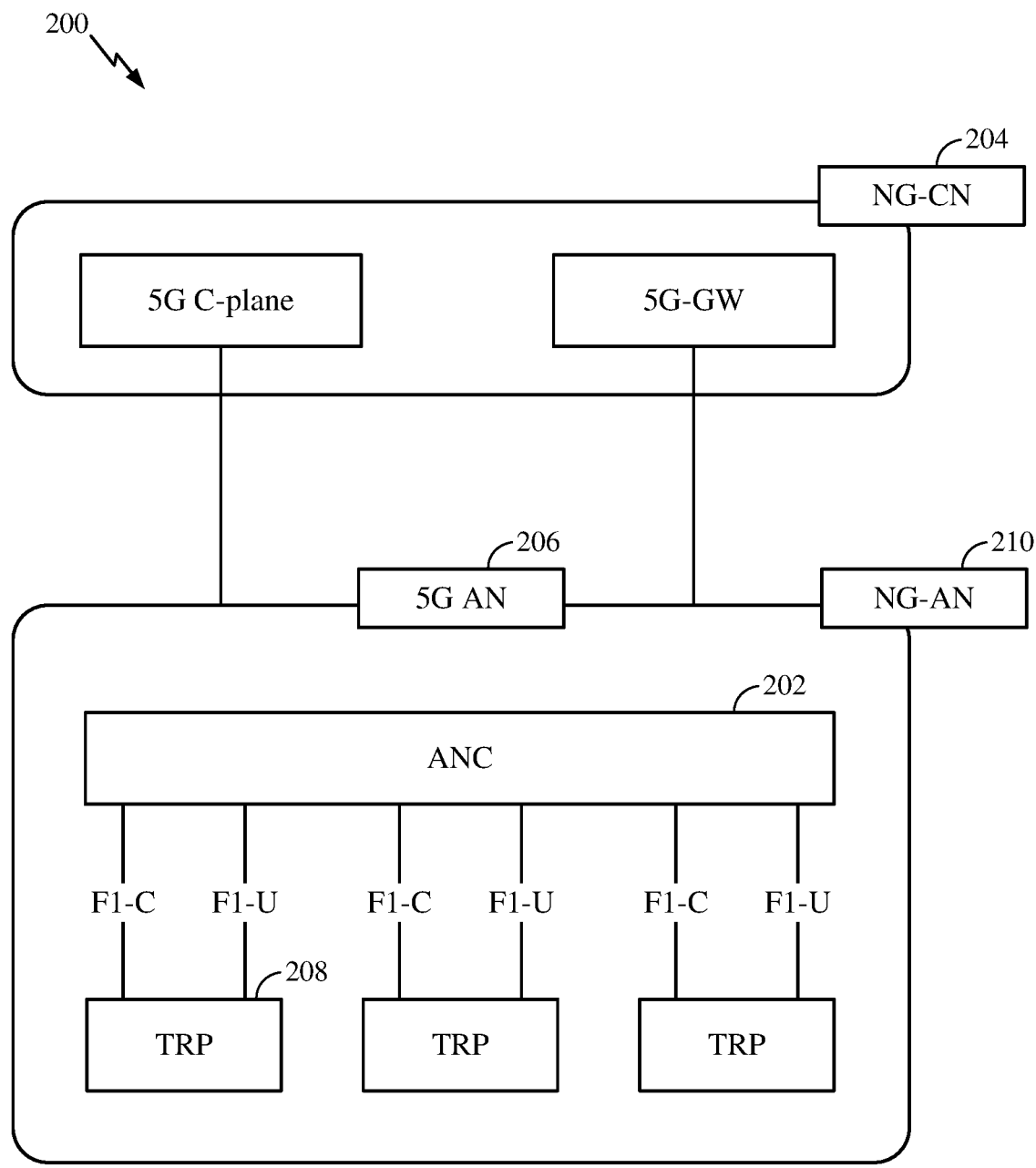
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
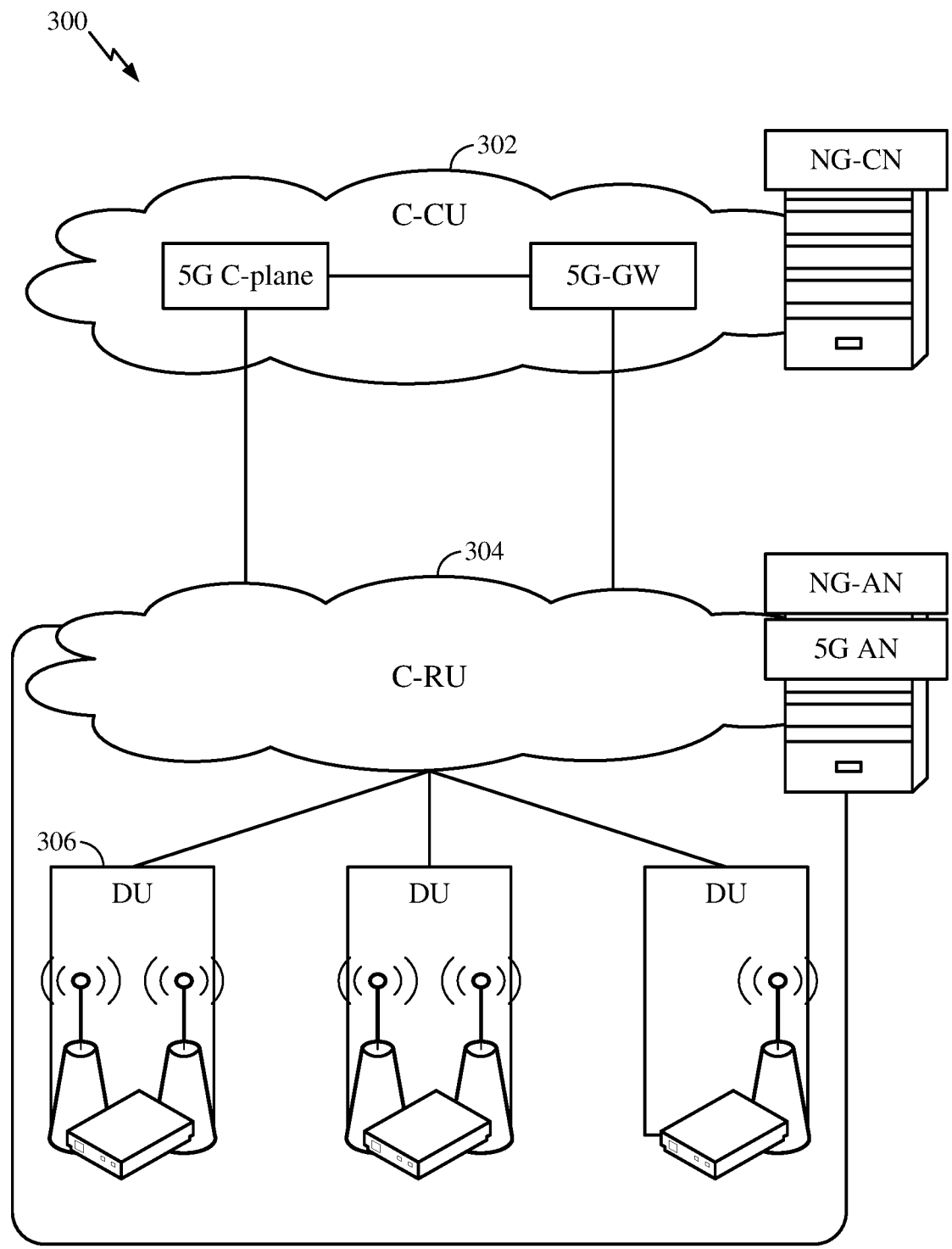
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
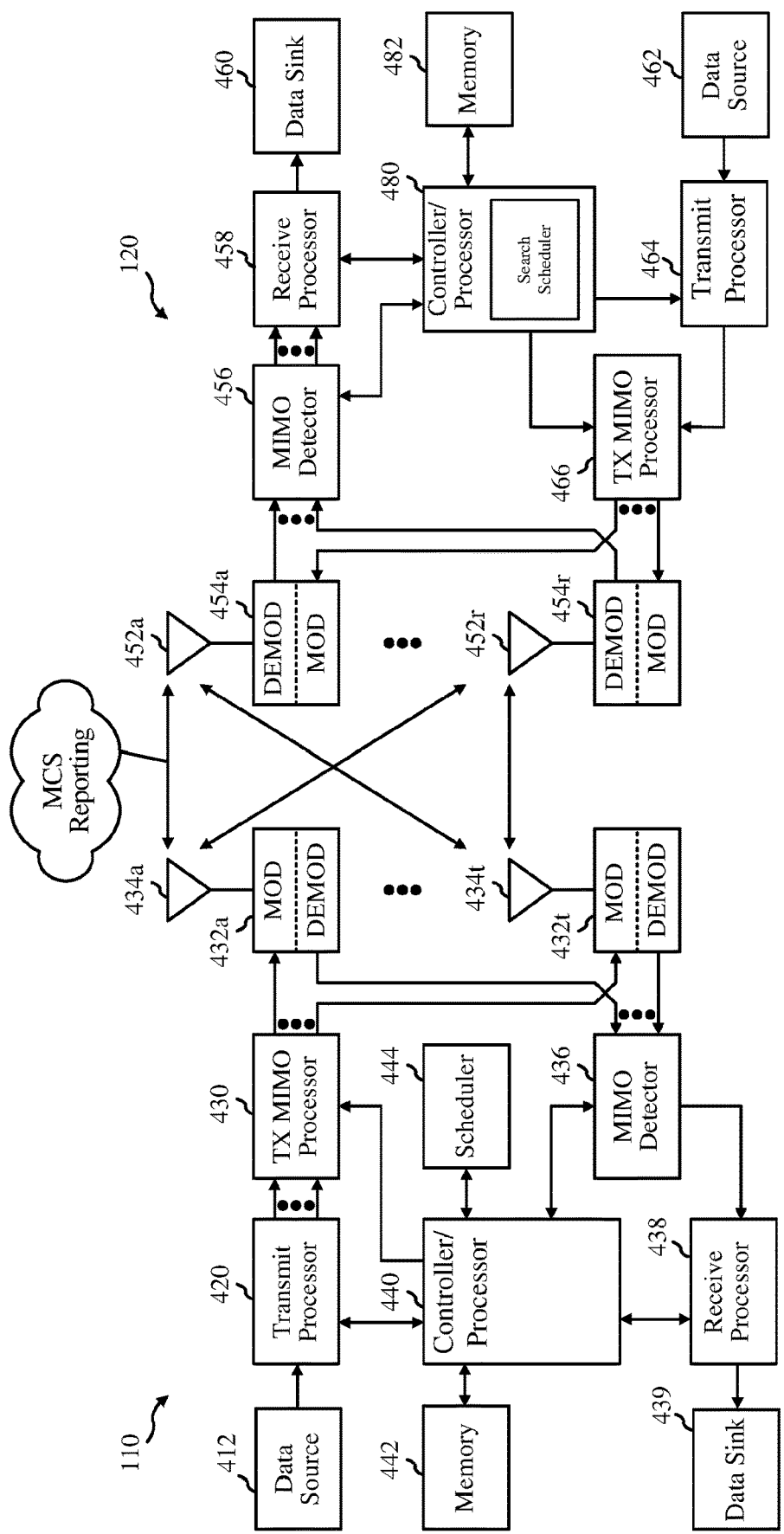
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)) or synchronization signals. The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The processor 480 and/or other processors and modules at the UE 120 may perform or direct the execution of processes for the techniques described herein. For example, as shown in FIG. 4, the processor 480 has a search scheduler for scheduling reception of synchronization signals transmitted by BSs on receive beams of a plurality of receive beams of the UE 120 as part of a prioritized cell/transmit beam search procedure, according to aspects disclosed herein. The memories 442 and 482 may store data and program codes for BS 110 and UE 120, respectively. A scheduler 444 may schedule UEs for data transmission on the downlink and/or uplink.

Figure 5:
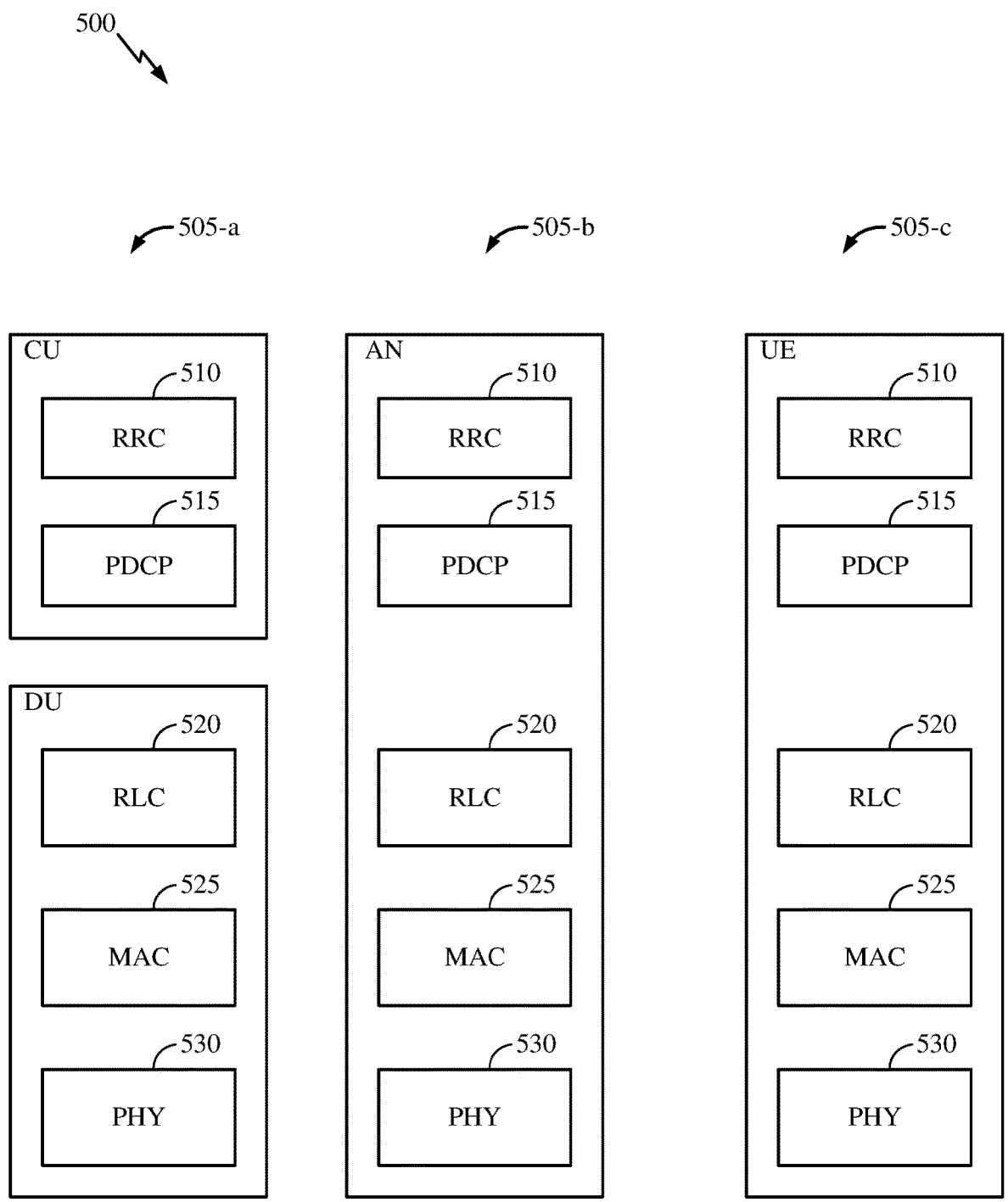
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
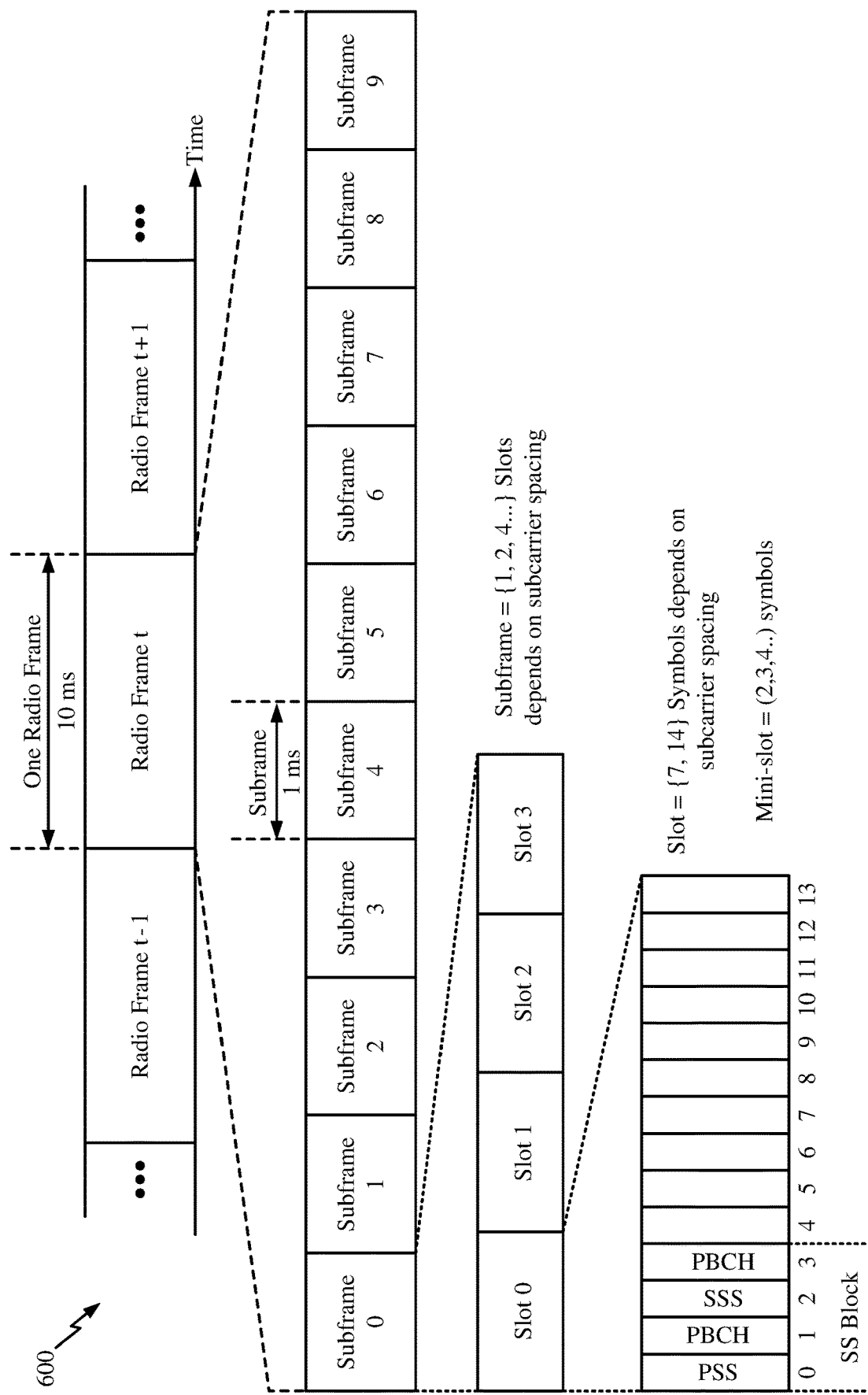
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within a radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Prioritized Search Scheduling for Receive Beams at a User Equipment

As discussed, for UE 120 to communicate in a wireless communication network, such as wireless communication network 100, it communicates with a BS 110. Further, as discussed, the UE 120 may determine which BS 110 to communicate with based on synchronization signals received from the BSs. Accordingly, a BS 110 may transmit synchronization signal blocks (SSBs) (e.g., including one or more synchronization signals such as a primary synchronization signal (PSS) and secondary synchronization signal (SSS) along with PBCH). In certain aspects, the BS 110 may support beamforming to spatially beamform and transmit signals as different Tx beams in different spatial directions. Accordingly, the BS 110 may need to perform beam sweeping and transmit SSBs over each of the beams in order to cover the cell of the BS 110.

Figure 7:
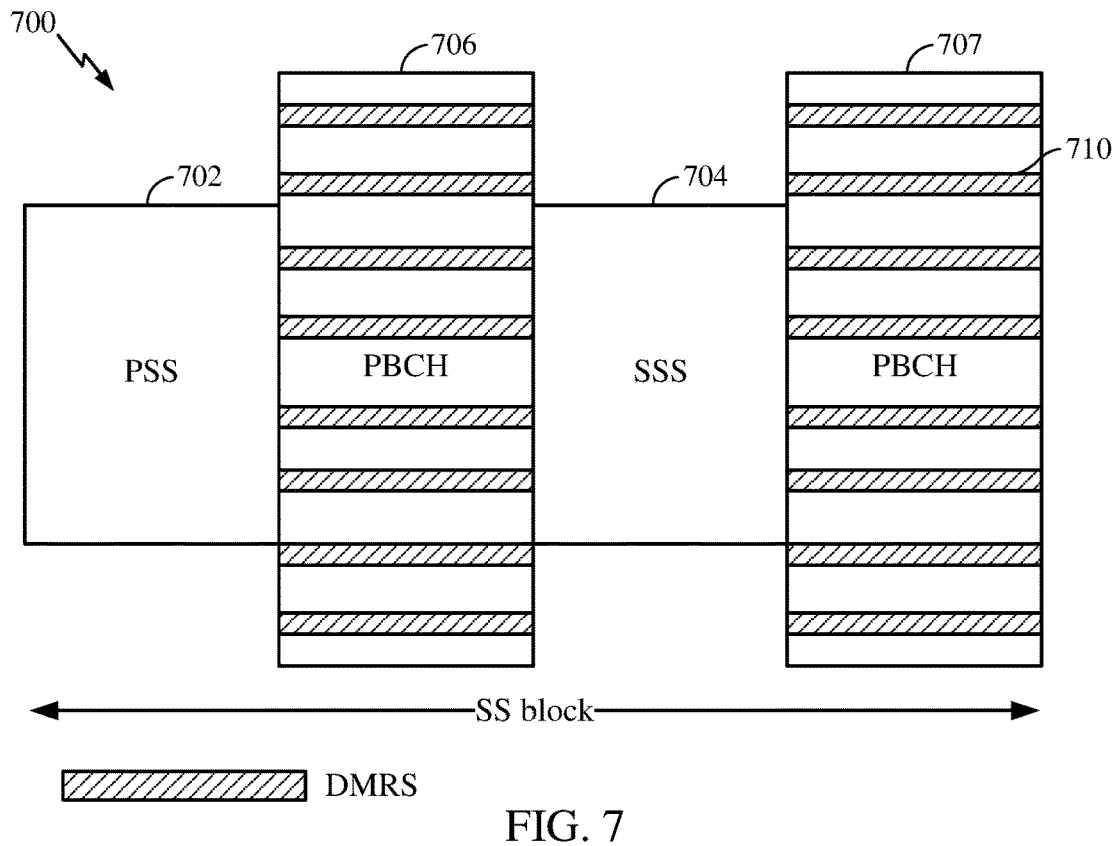
FIG. 7 illustrates an example of a synchronization signal block (SSB), in accordance with certain aspects.

FIG. 7 illustrates an example of a SSB 700, in accordance with certain aspects. The X-axis in the illustration of FIG. 7 indicates time (e.g., symbols), and the Y-axis indicates frequency (e.g., tones). As shown, SSB 700 includes a PSS 702, a SSS 704, a PBCH 706, and a PBCH 707 multiplexed in the time domain and allocated to certain frequency ranges. In certain aspects, the PSS 702 and SSS 704 are allocated to the same frequency range. Further, in certain aspects, the PBCH 706 and PBCH 707 are allocated to the same frequency range. In certain aspects, the PSS 702 and SSS 704 are allocated to a portion (e.g., half) of the frequency range of the PBCH 706 and PBCH 707. Though shown in a particular order in SSB 700 and of particular durations and frequency allocations, it should be noted that the order, durations, and frequency allocations of the PSS 702, SSS 704, PBCH 706, and PBCH 707 may be different. Further, the SSB 700 may include additional or fewer reference signals or additional or fewer PBCH. Further, in certain aspects, for each of PBCH 706 and PBCH 707, certain portions (e.g., frequency ranges, tones, resource elements (REs)) are allocated to transmission of reference sequences, such as in demodulation reference signal (DMRS) 710. In certain aspects, the allocation may be different than shown in FIG. 7.

In certain aspects, multiple SSBs may be assigned to a set of resources to transmit the multiple SSBs (such a set of resources for transmitting multiple SSBs may be referred to herein as a SS burst set). The multiple SSBs may be assigned to periodic resources (e.g., every 20 ms) and transmitted periodically by a BS (e.g., BS 110) in a cell. For example, a SS burst set may include a number L of SSBs (e.g., 4, 8, or 64). In certain aspects the number L of SSBs included in a SS burst set is based on the frequency band used for transmission. For example, for sub 6 GHz frequency transmissions, L may equal 4 or 8 (e.g., 0-3 GHz L=4, 3-6 GHz L=8). In another example, for transmission above 6 GHz, L may equal 64. For example, transmission by the BS 110 in a cell may be beamformed, so that each transmission only covers a portion of the cell. Therefore, different SSBs in a SS burst set may be transmitted in different directions on different Tx beams so as to cover the cell. The number L of SSBs in a SS burst set may represent a maximum allowed number of SSBs that can be transmitted within the SS burst set. In other words, the BS 110 may have flexibility in terms of which SSBs are actually transmitted. For example, a BS 110 operating in a frequency band above 6 GHz may have opportunity to transmit up to 64 SSBs within the SS burst set, but the BS 110 may transmit fewer than the allocated possible 64 SSBs.

Figure 8:
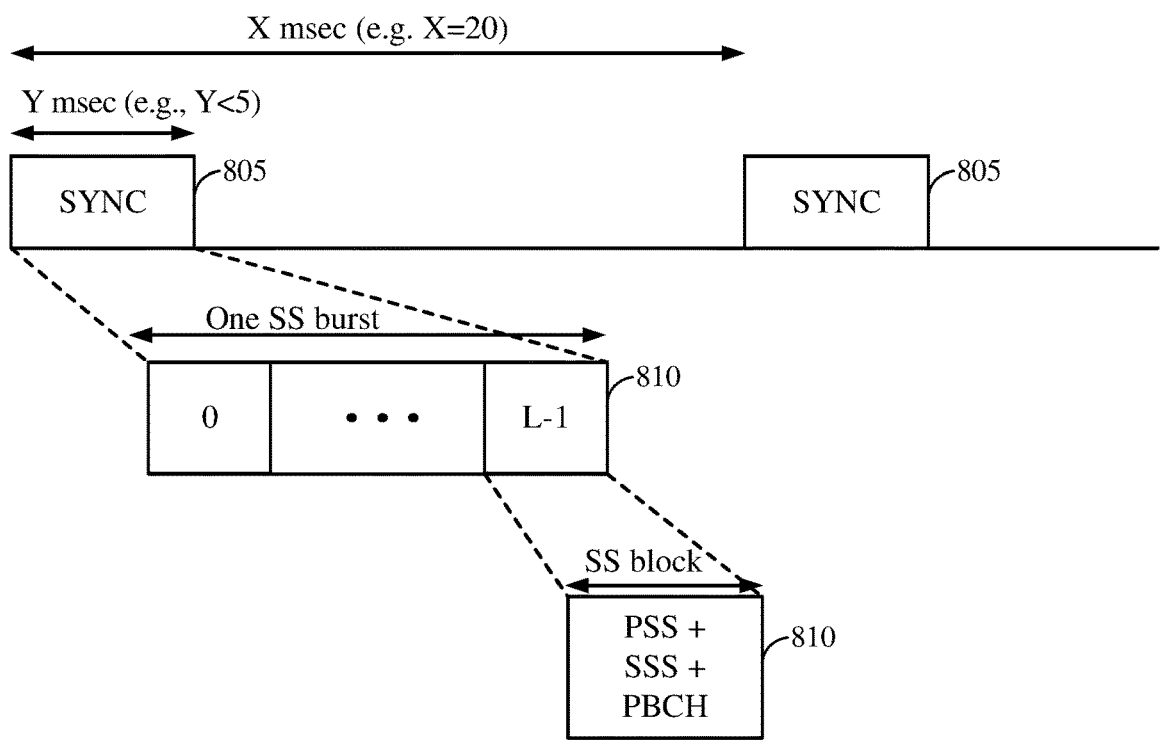
FIG. 8 illustrates an example of the timing of transmission of SSBs, in accordance with certain aspects.

FIG. 8 illustrates an example of the timing of transmission of SSBs, in accordance with certain aspects. As shown, a SS burst set 805 may be transmitted periodically every X msec (e.g., X=20). Further, the SS burst set 805 may have a duration of Y msec (e.g., Y<5), wherein all of the SSBs 810 in the SS burst set 805 are transmitted within the duration Y. As shown in FIG. 8, each SSB 810 includes a PSS, SSS, and PBCH. SSB 810 may for example, correspond to a SSB 700. SS burst set 805 includes a maximum of L SSBs 810 each having a corresponding SSB index (e.g., 0 through L−1) indicating its location within the SS burst set, e.g. indicating the physical transmission ordering in time of the SSBs 810. Though the SSBs 810 are shown allocated in time consecutively in SS burst set 805, it should be noted that the SSBs 810 may not be allocated consecutively. For example, there may be separation in time (e.g., of the same or different durations) between the SSBs 810 in the SS burst set 805. The allocation of time of the SSBs 810 may correspond to a particular pattern, which may be known to the BS 110 and UE 120.

As discussed, UE 120 may have a number of search opportunities scheduled in which it can receive the one or more synchronization signals, and certain aspects provide for determining which receive beam to use for each given search opportunity. In certain aspects, each search opportunity corresponds to timing of a different SS burst set transmitted by one or more BSs 110 (e.g., the SS burst sets from different BSs 110 may be scheduled at the same time). Accordingly, in certain aspects, during a search opportunity, UE 120 receives SS burst sets transmitted from one or more BSs 110, each SS burst set including one or more synchronization signals transmitted over one or more Tx beams, as discussed. Thus, as discussed, UE 120 during a search opportunity receives, using one of its Rx beams, any synchronization signals from any BS in any cell over any Tx beam that overlaps with the Rx beam spatially and is transmitted within the search opportunity.

Figure 9:
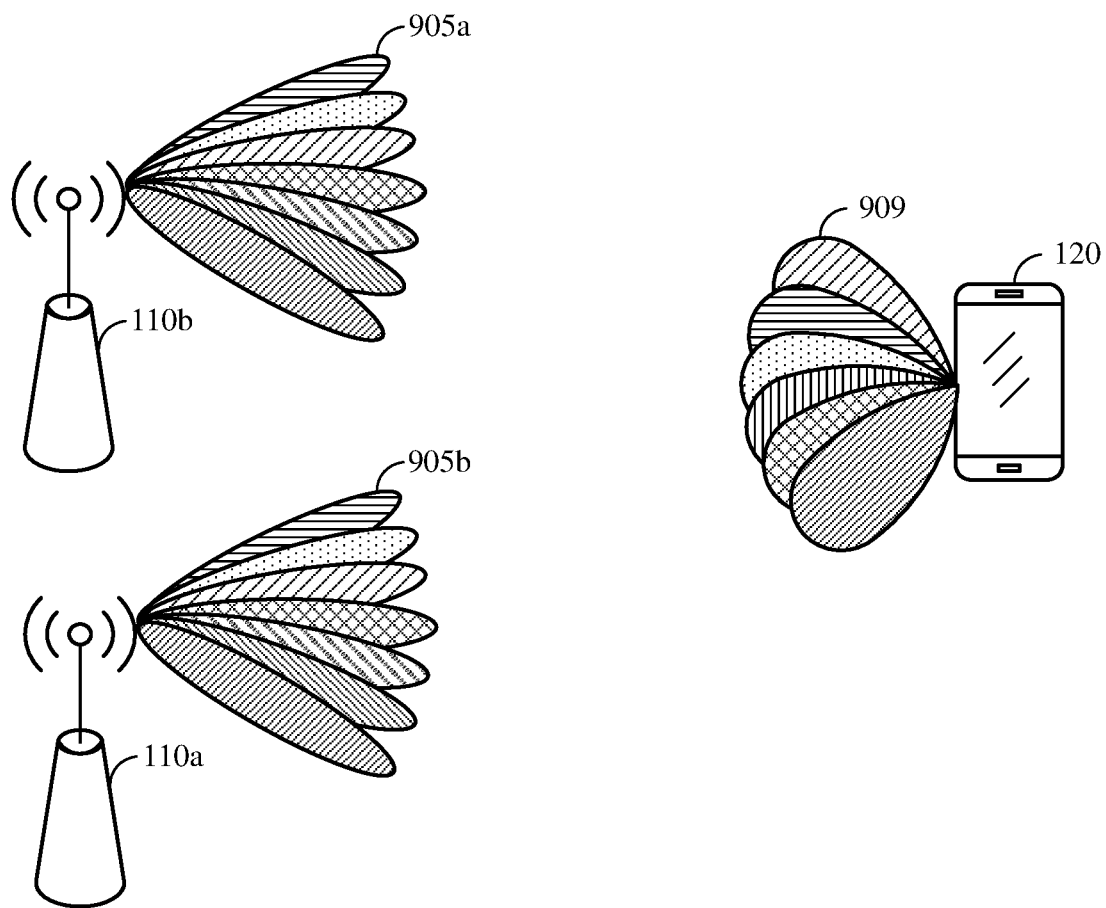
FIG. 9 illustrates example beamformed transmission by BSs and beamformed reception by a UE, in accordance with certain aspects.

FIG. 9 illustrates example beamformed transmission by BSs 110 and beamformed reception by UE 120. As shown, each of BS 110a and 110b transmits over a plurality of Tx beams 905a and 905b, respectively. Further, UE 120 receives over a plurality of Rx beams 909. In certain aspects the Rx beams 909 are psuedo omni (PO) beams (e.g., that cover a 90 degree angle in space in three dimensions). For example, each of BS 110a and 110b may transmit synchronization signals (e.g., in SS burst sets) over Tx beams 905a and 905b, respectively, during scheduled time periods. Further, UE 120 uses a scheduled time period as a search opportunity and uses one of its Rx beams 909 to receive the synchronizations signals transmitted during the scheduled time period according to a prioritized scheduling according to aspects disclosed herein. Based on the received synchronization signals, such as over multiple search opportunities, UE 120 may determine to communicate with a BS 110 that transmitted a particular synchronization signal (e.g., that meets a criteria as discussed) in the cell in which the synchronization signal was transmitted using the Tx-Rx beam pair over which the synchronization signal was transmitted by the BS 110 and received by UE 120.

As discussed, UE 120 may be configured with a large number of Rx beams 909. Accordingly, if the UE 120 were to use each of the Rx beams 909 equally (e.g., in a round robin fashion) for receiving synchronization signals over the number of search opportunities, it may take a long period of time to find an appropriate Tx-Rx beam pair and cell to use for communication as the best suited Rx beam 909 may not be used for a long period of time. For example, it may take a long period of time for UE 120 to detect a new rising Tx beam (e.g., rising in signal strength), such as in high mobility cases where the UE 120 is in motion and channel conditions are rapidly changing. Accordingly, certain aspects herein provide techniques for prioritizing reception of synchronization signals using certain Rx beams over other Rx beams, such as to improve latency/delay in determining a suitable Tx-Rx beam pair and cell to use for communication in a wireless communication network.

In certain aspects herein, one or more Rx beams 909 of UE 120 are defined as prioritized Rx beams of a prioritized UE Rx beam set. The UE 120 is configured to select those Rx beams 909 in the prioritized UE Rx beam set with a higher priority than other Rx beams 909 for receiving synchronization signals during search opportunities.

Figure 10A:
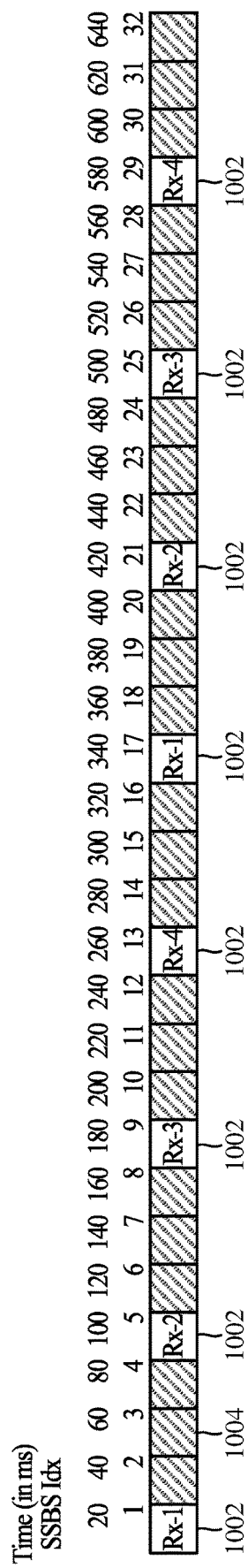
FIG. 10A illustrates a sequence of search opportunities, in accordance with certain aspects.

For example, FIG. 10A illustrates a sequence of search opportunities 1002 and 1004 of UE 120. As shown, there are two types of search opportunities: regular search opportunities 1002 and prioritized search opportunities 1004. In certain aspects, prioritized search opportunities 1004 occur more frequently in time than regular search opportunities 1002. For example, as shown in FIG. 10A, each regular search opportunity 1002 is followed by a plurality, in this case 3, prioritized search opportunities 1004 in a repeating fashion. For ease of illustration, each of the illustrated regular search opportunities 1002 are labeled as such in FIG. 10A, while the remaining search opportunities illustrated are prioritized search opportunities 1004.

In certain aspects, during each regular search opportunity 1002, one of the one or more Rx beams 909 (e.g., both prioritized Rx beams and the other Rx beams) of UE 120 is used for receiving. In certain aspects, once a particular Rx beam is used for a regular search opportunity 1002 it is not used again for a regular search opportunity 1002 until each of the other Rx beams 909 is used for a subsequent regular search opportunity 1002. For example, the Rx beams 909 may be used in a round robin fashion for the regular search opportunities 1002, such as if there are Rx beams 1-4, they are used for regular search opportunities 1002 in repeating order as follows 1, 2, 3, 4, 1, 2, 3, 4, etc. Accordingly, in certain aspects, each of the Rx beams 909 is used equally across the regular search opportunities 1002, which may help to ensure that no Rx beam 909 is missed from use as a potential candidate Rx beam for wireless communication in the network.

In certain aspects, during each prioritized search opportunity 1004, one of the prioritized Rx beams (and not the other Rx beams) of UE 120 is used for receiving.

In certain aspects, the one or more Rx beams 909 of UE 120 that are defined as prioritized Rx beams of a prioritized UE Rx beam set are statically configured, such as at time of manufacture of the UE 120, by signaling from BS 110, during an over-the-air update, etc. For example, the prioritized Rx beams may correspond to a minimal viable PO (MVP) beam set. In particular, the prioritized Rx beams may be defined to meet one or more requirements. For example, one requirement may be for the prioritized Rx beams to provide a certain spherical coverage spatially. Another requirement may be for the prioritized Rx beams to meet a certain minimum array gain restriction across the spherical coverage spatially, meaning each direction should be received with a minimum gain summed across the prioritized Rx beams. Another requirement may be that there is a certain number of redundant beams in each direction, such as to account for potential obstacles (e.g., a hand on UE 120) blocking one or more of the prioritized Rx beams at a given time, or a hole in coverage. The prioritized Rx beams are less than all of the Rx beams 909 of UE 120, as UE 120 may be configured with a codebook design that has more UE beams than required to meet the requirements discussed.

In certain aspects, where the prioritized Rx beams of a prioritized UE Rx beam set are statically configured, once a particular prioritized Rx beam is used for a prioritized search opportunity 1004 it is not used again for a prioritized search opportunity 1004 until each of the other prioritized Rx beams is used for a subsequent prioritized search opportunity 1004. For example, the prioritized Rx beams may be used in a round robin fashion for the prioritized search opportunities 1004. Accordingly, in certain aspects, each of the prioritized Rx beams is used equally across the prioritized search opportunities 1004.

In certain aspects, the one or more Rx beams 909 of UE 120 that are defined as prioritized Rx beams of a prioritized UE Rx beam set are dynamically configured. For example, in certain aspects, prioritized Rx beams are selected from the Rx beams 909 of UE 120 based on measurement results on the Rx beams 909, such as measured signal quality (e.g., one or more of the metrics previously discussed) of the corresponding one or more synchronization signals as received using the Rx beams 909. In certain aspects, initially UE 120 does not have measurement results of each of the Rx beams 909, e.g., when UE 120 is initially powered on, and therefore UE 120 receives synchronization signals and determines measurement results across search opportunities for each of the Rx beams 909 as part of an initial configuration before switching to using a prioritized search scheduling as discussed herein.

In certain aspects, UE 120 selects as prioritized Rx beams those Rx beams 909 of UE 120 that have a measured signal quality that satisfies a threshold (e.g., a quality/strength above a threshold). For example, UE 120 collapses (e.g., as a MAX function) across filtered received power all available SSBs and all cells on each Rx beam 909. Those Rx beams 909 whose collapsed value is above a threshold may be selected as a prioritized Rx beam.

In certain aspects, once UE 120 selects the prioritized Rx beams, it does not reevaluate and reselect a new set of prioritized Rx beams until after a time period. In certain aspects, the time period is based on the number of prioritized Rx beams selected. For example, the time period may be a number of prioritized search opportunities 1004 less than, equal to, or greater than the number of prioritized Rx beams. For example, in certain aspects, the time period is set so that each of the selected prioritized Rx beams is used (e.g., 1 or N number of times) during a prioritized search opportunity 1004. The prioritized Rx beams may be used for prioritized search opportunities 1004 in order of measured signal quality (e.g., best to worst), in a round robin fashion, etc.

In certain aspects, each of the prioritized Rx beams is associated with a counter or flag. Each time one of the prioritized Rx beams is used for a search opportunity, including either a regular search opportunity 1002 or a prioritized search opportunity 1004, the counter is incremented or flag set indicating use of the prioritized Rx beam. Once each prioritized Rx beam is used 1 or N number of times, the UE 120 reevaluates and reselects a new set of prioritized Rx beams. In such aspects, the searching of prioritized Rx beams across both regular search opportunities 1002 and prioritized search opportunities 1004 may be more evenly distributed, helping to further reduce latency.

In certain aspects, different Rx beams are selected for search opportunities adjacent to one another, including both regular search opportunities 1002 and prioritized search opportunities 1004, again leading to a more evenly distributed use of Rx beams, helping to further reduce latency.

Accordingly, certain aspects herein provide certain benefits, such as instead of blindly using each Rx beam 909 all the time, a subset is prioritized, which can shorten the delay in finding a new rising cell/beam. Another benefit is avoiding wasting search opportunities on those Rx beams 909 that have ignorable or no gains (e.g., in case of blockage), or that are spatially redundant in the codebook.

Figure 10B:
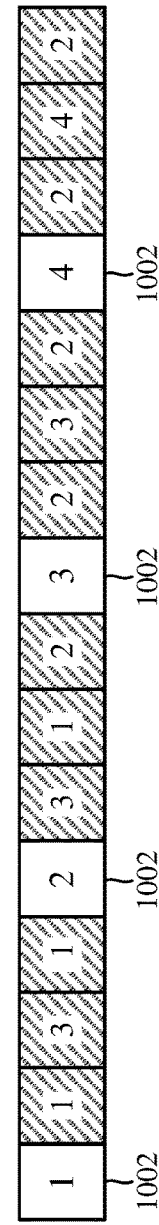
FIG. 10B illustrates a portion of the sequence of search opportunities shown in FIG. 10A.

FIG. 10B illustrates a portion of the sequence of search opportunities 1002 and 1004 shown in FIG. 10A. The numbers shown in each of the search opportunities 1002 and 1004 corresponds to a different Rx beam 1-4 of UE 120. As shown, each of regular search opportunities 1002 is used for Rx beams 1-4 in a round robin fashion. In this example, the UE 120 is configured to reevaluate the prioritized Rx beams every three prioritized search opportunities 1004. Initially, UE 120 determines that Rx beams 1 and 3 (e.g., in that order) are prioritized Rx beams. Accordingly, Rx beams 1 and 3 are used for the first, second, and third prioritized search opportunities 1004 in a round robin fashion as shown. The UE 120 may then reevaluate and determine that Rx beams 3, 1, and 2 (e.g., in that order) are prioritized Rx beams. Accordingly, Rx beams 3, 1, and 2 are used for the fourth, fifth, and sixth prioritized search opportunities 1004. The UE 120 may then reevaluate and determine that Rx beams 2 and 3 (e.g., in that order) are prioritized Rx beams. Accordingly, Rx beams 2 and 3 are used for the seventh, eighth, and ninth prioritized search opportunities 1004 in a round robin fashion as shown. The UE 120 may then reevaluate and determine that Rx beams 2 and 4 (e.g., in that order) are prioritized Rx beams. Accordingly, Rx beams 2 and 4 are used for the tenth, eleventh, and twelfth prioritized search opportunities 1004 in a round robin fashion as shown.

Figure 11:
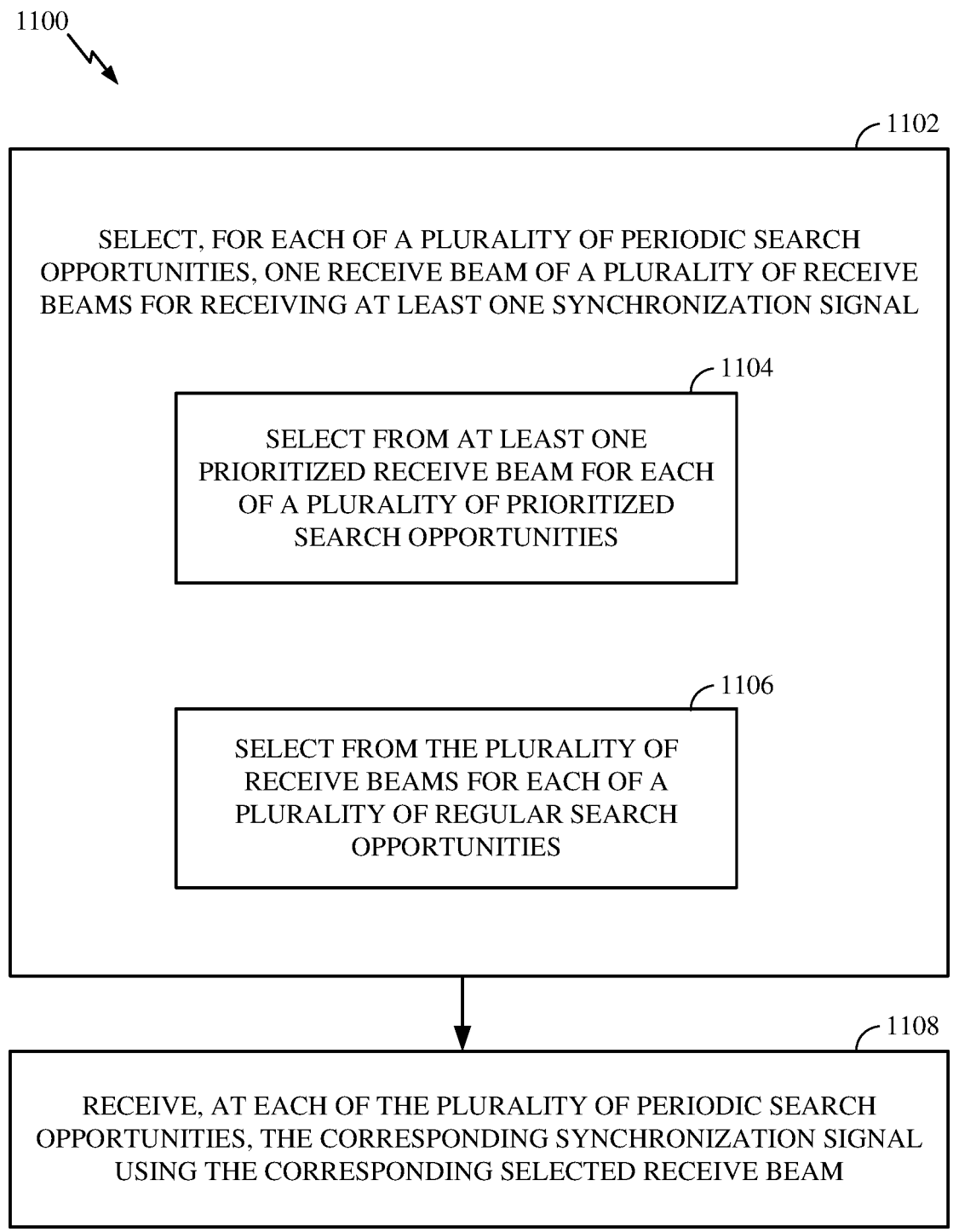
FIG. 11 is a flow diagram illustrating example operations for wireless communication, in accordance with certain aspects of the present disclosure

FIG. 11 is a flow diagram illustrating example operations 1100 for wireless communication, in accordance with certain aspects of the present disclosure. The operations 1100 may be performed by a UE, such as the UE 120.

The operations 1100 begin, at block 1102, by selecting, for each of a plurality of periodic search opportunities, one receive beam of a plurality of receive beams for receiving at least one synchronization signal. The plurality of periodic search opportunities includes a plurality of regular search opportunities and a plurality of prioritized search opportunities. The plurality of receive beams include at least one prioritized receive beam and at least one additional receive beam. As shown, the selecting of block 1102 includes performing blocks 1104 and 1106. At block 1104, the UE selects from the at least one prioritized receive beam for each of the plurality of prioritized search opportunities. At block 1106, the UE selects from the plurality of receive beams for each of the plurality of regular search opportunities. Continuing at block 1108, the UE receives, at each of the plurality of periodic search opportunities, the corresponding synchronization signal using the corresponding selected receive beam.

In certain aspects as discussed, the at least one prioritized receive beam is statically defined. In certain other aspects, the UE dynamically determines the at least one prioritized receive beam based on measured signal quality of the corresponding at least one synchronization signal as received using the plurality of receive beams, as discussed. In some such aspects, the at least one prioritized receive beam is dynamically determined once every time period. In some such aspects, the time period is based on a number of the at least one prioritized receive beam. In other such aspects, the at least one prioritized receive beam is dynamically determined as at least one of the plurality of receive beams with a measured signal quality above a threshold.

In certain aspects, different receive beams are selected for adjacent search opportunities as discussed.

In certain aspects, the plurality of periodic search opportunities include a number of periods, each period including a regular search opportunity followed by multiple prioritized search opportunities as discussed.

In certain aspects, the plurality of receive beams includes a plurality of psuedo-omni receive beams as discussed.

In certain aspects, the at least one synchronization signal corresponds to at least one transmit beam of at least one base station as discussed.

In certain aspects, the UE further performs one of a beam switch or a handover procedure based on the receiving.

In certain aspects, the plurality of periodic search opportunities includes a plurality of time resources assigned to synchronization signal burst sets.

It should be noted that these certain aspects of operations 1100 described with respect to separate paragraphs may be combined with one another in any combination including one or more of the aspects.

Figure 12:
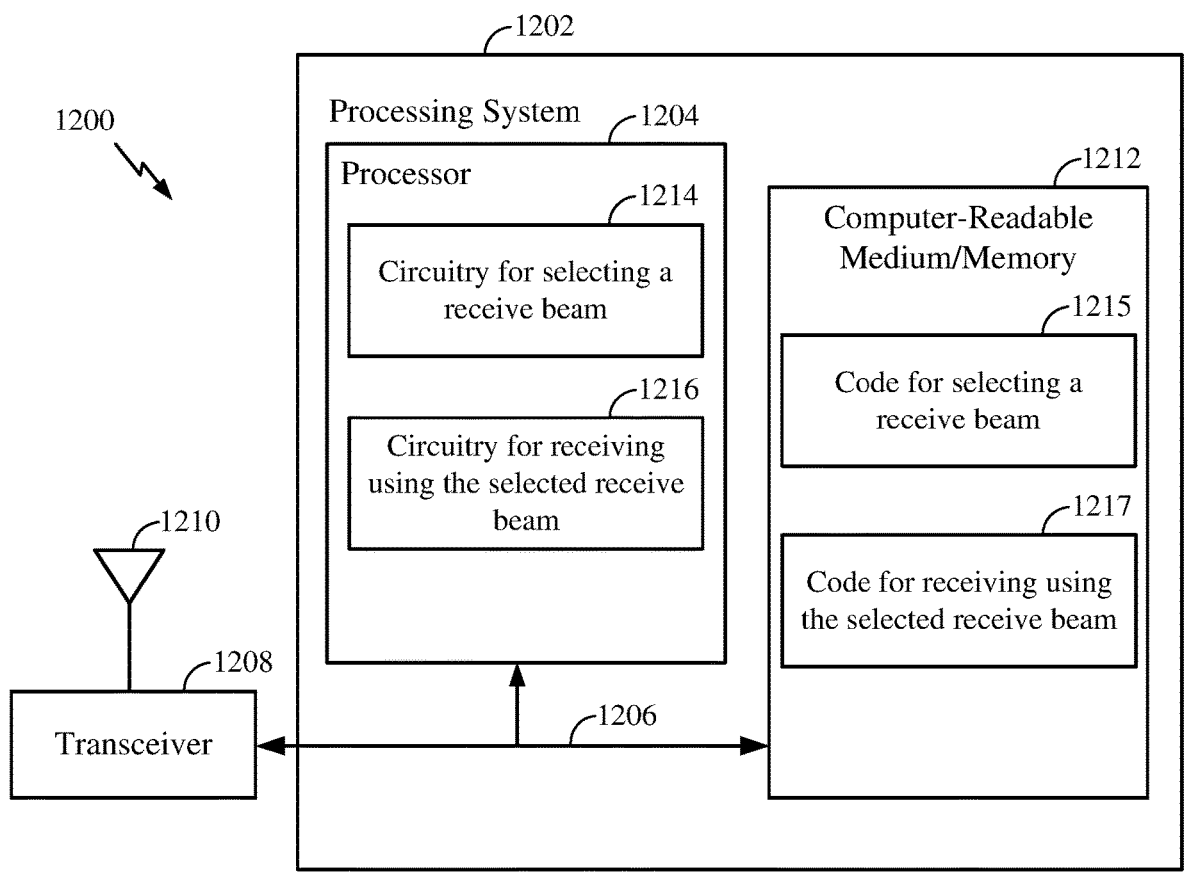
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 11. The communications device 1200 includes a processing system 1202 coupled to a transceiver 1208. The transceiver 1208 is configured to transmit and receive signals for the communications device 1200 via an antenna 1210, such as the various signals as described herein, for example, for transmitting uplink transmissions with different transmission configuration. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 11, or other operations for performing the various techniques discussed herein for search scheduling. In certain aspects, computer-readable medium/memory 1212 stores code 1215 for selecting a receive beam and code 1217 for receiving using the selected receive beam. In certain aspects, the processor 1204 has circuitry configured to implement the code stored in the computer-readable medium/memory 1212. The processor 1204 includes circuitry 1214 for selecting a receive beam and circuitry 1216 for receiving using the selected receive beam.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Moreover, operations illustrated in flow diagrams with dashed lines indicate optional features.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11.

Further, it should be appreciated that modules and/or other appropriate means for performing the methods and techniques described herein can be downloaded and/or otherwise obtained by a user equipment and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user equipment and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication at a user equipment (UE), comprising:
   selecting, for a plurality of search opportunities, receive beams of a plurality of receive beams for receiving synchronization signals, the plurality of receive beams comprising at least one receive beam and at least one additional receive beam, wherein:
      the plurality of search opportunities comprise a plurality of scheduled time periods for receiving the synchronization signals;
      the plurality of search opportunities comprise a plurality of regular search opportunities and a plurality of prioritized search opportunities; and
      the selecting for the plurality of search opportunities comprises:
         selecting from the at least one receive beam for a first search opportunity of the plurality of prioritized search opportunities; and
         selecting from at least the at least one additional receive beam for a second search opportunity of the plurality of regular search opportunities; and
   receiving, at the plurality of search opportunities, the corresponding synchronization signals using the corresponding selected receive beams.

2. The method of claim 1, wherein the at least one receive beam is at least one prioritized receive beam, wherein the selecting for the plurality of search opportunities comprises:
   selecting from the at least one prioritized receive beam for the plurality of prioritized search opportunities; and
   selecting from the at least the at least one additional receive beam for the plurality of regular search opportunities.

3. The method of claim 2, wherein:
   selecting from the at least the at least one additional receive beam for the plurality of regular search opportunities comprises selecting from the at least the at least one additional receive beam such that once a given receive beam of the at least the at least one additional receive beam is selected it is not selected again until all other receive beams of the at least the at least one additional receive beam are selected;
selecting from the at least one prioritized receive beam for the plurality of prioritized search opportunities comprises selecting from the at least one prioritized receive beam such that once a given receive beam of the at least one prioritized receive beam is selected it is not selected again until all other receive beams of the at least one prioritized receive beam are selected; or
any combination thereof.

4. The method of claim 1, further comprising dynamically determining the at least one receive beam based on measured signal quality of the corresponding synchronization signals as received using the plurality of receive beams.

5. The method of claim 4, wherein:
the at least one receive beam is dynamically determined based on each of the at least one receive beam having been selected at least a threshold number of times;
the at least one receive beam is dynamically determined once every time period, wherein the time period is based on a number of the at least one receive beam;
the at least one receive beam is dynamically determined as at least one of the plurality of receive beams with a measured signal quality above a threshold; or any combination thereof.

6. The method of claim 1, wherein different receive beams are selected for adjacent search opportunities.

7. A user equipment (UE) comprising:
one or more processors configured to execute instructions stored on one or more memories and to cause the UE to:
select, for a plurality of search opportunities, receive beams of a plurality of receive beams for receiving synchronization signals, the plurality of receive beams comprising at least one receive beam and at least one additional receive beam, wherein:
the plurality of search opportunities comprise a plurality of scheduled time periods for receiving the synchronization signals;
the plurality of search opportunities comprise a plurality of regular search opportunities and a plurality of prioritized search opportunities; and
to select for the plurality of search opportunities comprising to:
select from the at least one receive beam for a first search opportunity of the plurality of prioritized search opportunities; and
select from at least the at least one additional receive beam for a second search opportunity of the plurality of regular search opportunities; and
receive, at the plurality of search opportunities, the corresponding synchronization signals using the corresponding selected receive beams.

8. The UE of claim 7, wherein the at least one receive beam is at least one prioritized receive beam, wherein to select for the plurality of search opportunities comprises to:
select from the at least one prioritized receive beam for the plurality of prioritized search opportunities; and
select from the at least the at least one additional receive beam for the plurality of regular search opportunities.

9. The UE of claim 8, wherein to select from the at least the at least one additional receive beam for the plurality of regular search opportunities comprises to select from the at least the at least one additional receive beam such that once a given receive beam of the at least the at least one additional receive beam is selected it is not selected again until all other receive beams of the at least the at least one additional receive beam are selected.

10. The UE of claim 8, wherein to select from the at least the at least one additional receive beam for the plurality of regular search opportunities comprises to select from the at least the at least one additional receive beam for the plurality of regular search opportunities in a round robin fashion.

11. The UE of claim 8, wherein to select from the at least one prioritized receive beam for the plurality of prioritized search opportunities comprises to select from the at least one prioritized receive beam such that once a given receive beam of the at least one prioritized receive beam is selected it is not selected again until all other receive beams of the at least one prioritized receive beam are selected.

12. The UE of claim 8, wherein to select from the at least one prioritized receive beam for the plurality of prioritized search opportunities comprises to select from the at least one prioritized receive beam in a round robin fashion.

13. The UE of claim 7, wherein to select from at least the at least one additional receive beam comprises to select from the plurality of receive beams.

14. The UE of claim 7, wherein the plurality of search opportunities are a plurality of periodic search opportunities.

15. The UE of claim 7, wherein the at least one receive beam is statically defined.

16. The UE of claim 7, wherein the one or more processors are further configured to cause the UE to dynamically determine the at least one receive beam based on measured signal quality of the corresponding synchronization signals as received using the plurality of receive beams.

17. The UE of claim 16, wherein the at least one receive beam is dynamically determined based on each of the at least one receive beam having been selected at least a threshold number of times.

18. The UE of claim 16, wherein the at least one receive beam is dynamically determined once every time period.

19. The UE of claim 18, wherein the time period is based on a number of the at least one receive beam.

20. The UE of claim 16, wherein the at least one receive beam is dynamically determined as at least one of the plurality of receive beams with a measured signal quality above a threshold.

21. The UE of claim 7, wherein different receive beams are selected for adjacent search opportunities.

22. The UE of claim 7, wherein the plurality of search opportunities comprises a number of periods, each period comprising a regular search opportunity followed by multiple prioritized search opportunities.

23. The UE of claim 7, wherein the plurality of receive beams comprise a plurality of psuedo-omni receive beams.

24. The UE of claim 7, wherein the synchronization signals correspond to at least one transmit beam of at least one base station.

25. The UE of claim 7, wherein the one or more processors are further configured to cause the UE to perform one of a beam switch or a handover procedure based on the receiving.

26. The UE of claim 7, wherein the plurality of search opportunities comprise a plurality of time resources assigned to synchronization signal burst sets.

27. A user equipment (UE) comprising:
means for selecting, for a plurality of search opportunities, receive beams of a plurality of receive beams for receiving synchronization signals, the plurality of receive beams comprising at least one receive beam and at least one additional receive beam, wherein:

the plurality of search opportunities comprise a plurality of scheduled time periods for receiving the synchronization signals;

the plurality of search opportunities comprise a plurality of regular search opportunities and a plurality of prioritized search opportunities; and the means for selecting for the plurality of search opportunities being configured to:

select from the at least one receive beam for a first search opportunity of the plurality of prioritized search opportunities; and select from at least the at least one additional receive beam for a second search opportunity of the plurality of regular search opportunities; and means for receiving, at the plurality of search opportunities, the corresponding synchronization signals using the corresponding selected receive beams.

28. A non-transitory computer readable storage medium that stores instructions that when executed by a user equipment (UE) cause the UE to perform a method for wireless communication, the method comprising:

selecting, for a plurality of search opportunities, receive beams of a plurality of receive beams for receiving synchronization signals, the plurality of receive beams comprising at least one receive beam and at least one additional receive beam, wherein:

the plurality of search opportunities comprise a plurality of scheduled time periods for receiving the synchronization signals;

the plurality of search opportunities comprise a plurality of regular search opportunities and a plurality of prioritized search opportunities; and the selecting for the plurality of search opportunities comprising:

selecting from the at least one receive beam for a first search opportunity of the plurality of prioritized search opportunities; and selecting from at least the at least one additional receive beam for a second search opportunity of the plurality of regular search opportunities; and receiving, at the plurality of search opportunities, the corresponding synchronization signals using the corresponding selected receive beams.

\* \* \* \* \*